(12) United States Patent
Bell et al.

(10) Patent No.: US 8,753,092 B2
(45) Date of Patent: *Jun. 17, 2014

(54) ROTOR BLADE FOR A WIND TURBINE AND METHODS OF MANUFACTURING THE SAME

(71) Applicant: General Electric Company, Schenectady, NY (US)

(72) Inventors: Eric Lee Bell, Greenville, SC (US); Brandon Shane Gerber, Charleston, SC (US); Alexander William Vossler, Greenville, SC (US)

(73) Assignee: General Electric Company, Schenectady, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/727,816

(22) Filed: Dec. 27, 2012

(65) Prior Publication Data

US 2013/0101428 A1 Apr. 25, 2013

Related U.S. Application Data

(63) Continuation of application No. 13/228,708, filed on Sep. 9, 2011, now Pat. No. 8,360,733.

(51) Int. Cl.
*F03D 1/06* (2006.01)

(52) U.S. Cl.
USPC ..................................................... 416/229 R

(58) Field of Classification Search
USPC .......... 244/123.6, 123.7, 123.8, 123.9, 123.5; 416/226, 229 R
See application file for complete search history.

(56) References Cited

U.S. PATENT DOCUMENTS

| 3,695,778 | A | * | 10/1972 | Taylor | 416/92 |
| 4,412,784 | A | | 11/1983 | Wackerle et al. | |
| 4,494,910 | A | * | 1/1985 | Hahn et al. | 416/226 |
| 5,489,228 | A | | 2/1996 | Richardson | |
| 8,250,761 | B2 | * | 8/2012 | Tobin | 29/889.7 |
| 8,360,733 | B2 | * | 1/2013 | Bell et al. | 416/226 |
| 2008/0069699 | A1 | | 3/2008 | Bech | |
| 2009/0162208 | A1 | | 6/2009 | Zirin et al. | |
| 2009/0264034 | A1 | | 10/2009 | Gasparro | |
| 2010/0028159 | A1 | | 2/2010 | Brown | |
| 2011/0223032 | A1 | * | 9/2011 | Tobin | 416/229 R |

FOREIGN PATENT DOCUMENTS

EP 1707805 10/2006

OTHER PUBLICATIONS

Pirsch, Stephen, "How to Build Your First Surfboard", pp. 1-8, www.surfersteve.com/polystyrene.htm 2003.

* cited by examiner

*Primary Examiner* — Richard Edgar
(74) *Attorney, Agent, or Firm* — Dority & Manning, P.A.

(57) ABSTRACT

In one aspect, a method for manufacturing a rotor blade for a wind turbine is disclosed. The method may generally include assembling a blade blank comprising a shear member and a volume of core material and removing material from the blade blank to form a body having a pressure side and a suction side extending between a leading edge and a trailing edge. The shear member may have a first end disposed adjacent to the pressure side and a second end disposed adjacent to the suction side. In addition, the method may include positioning a skin around an outer perimeter of the body.

18 Claims, 9 Drawing Sheets

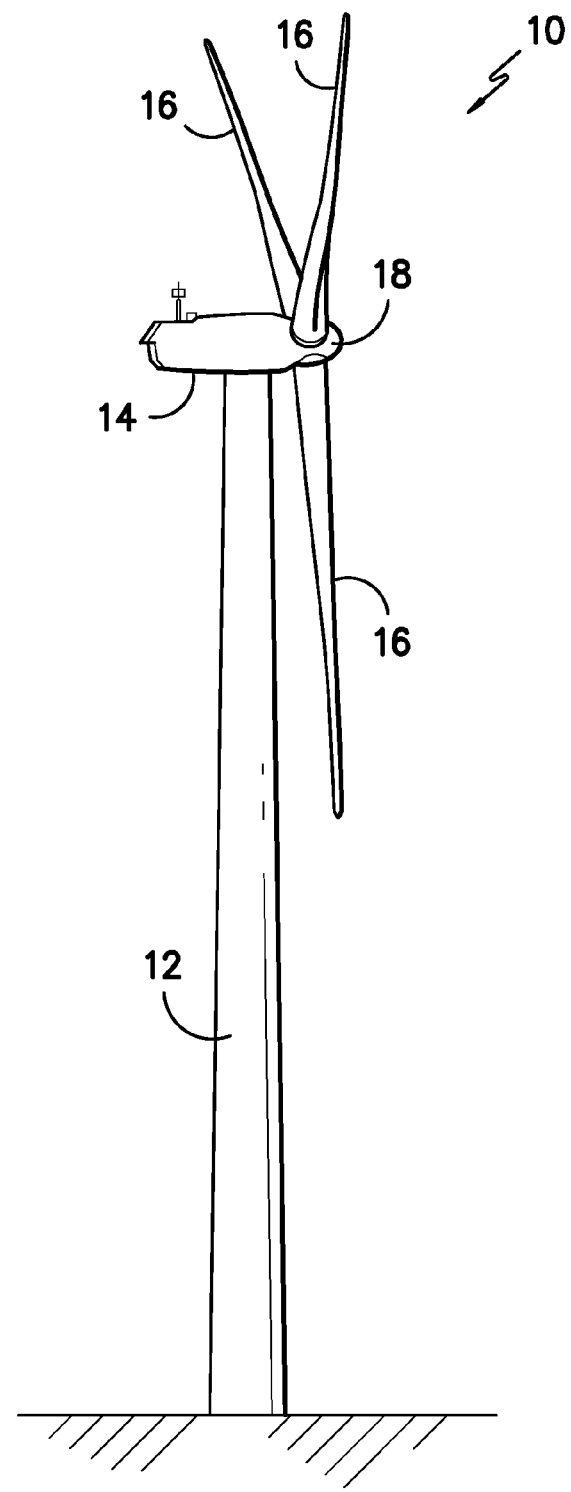
FIG. -1-

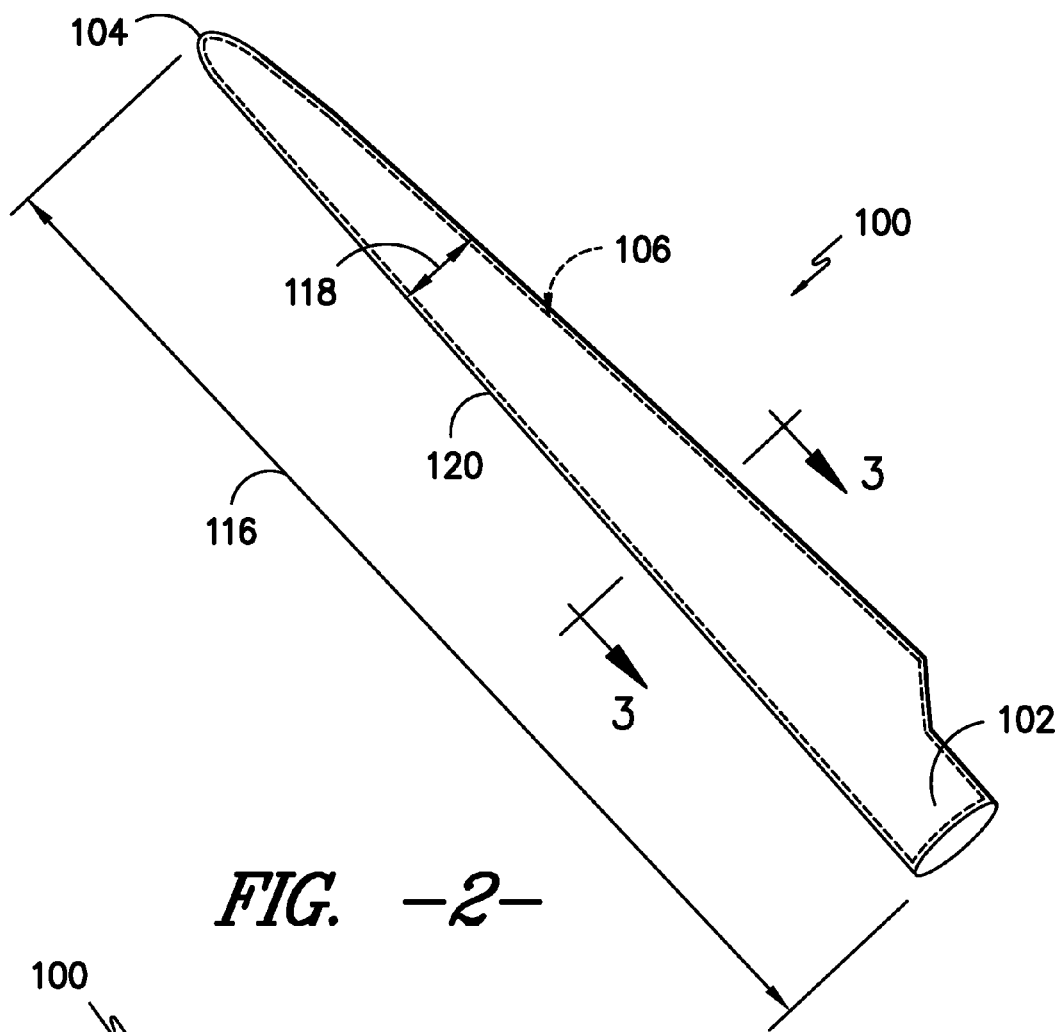
FIG. -2-
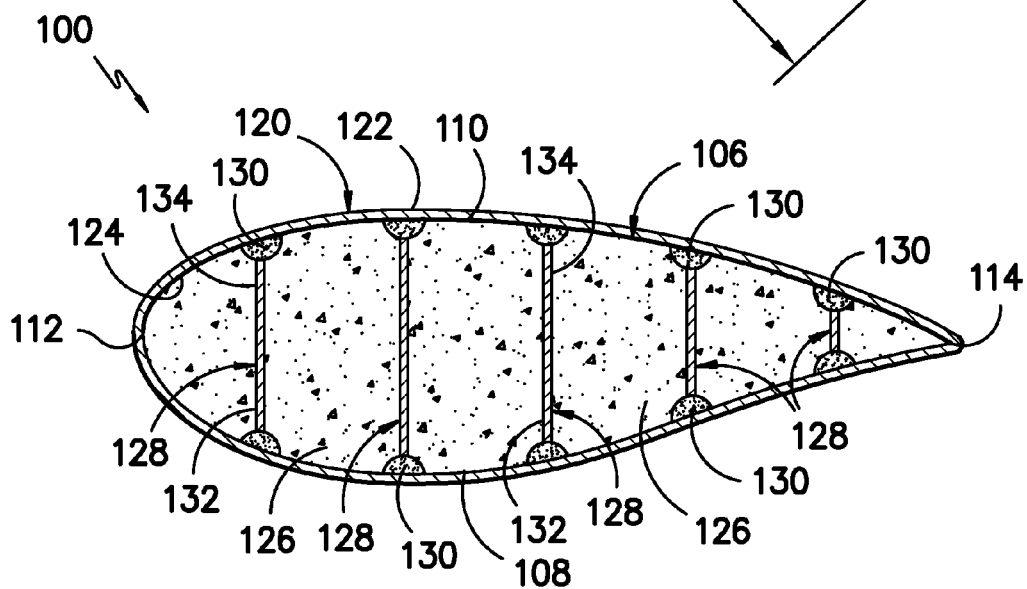
FIG. -3-

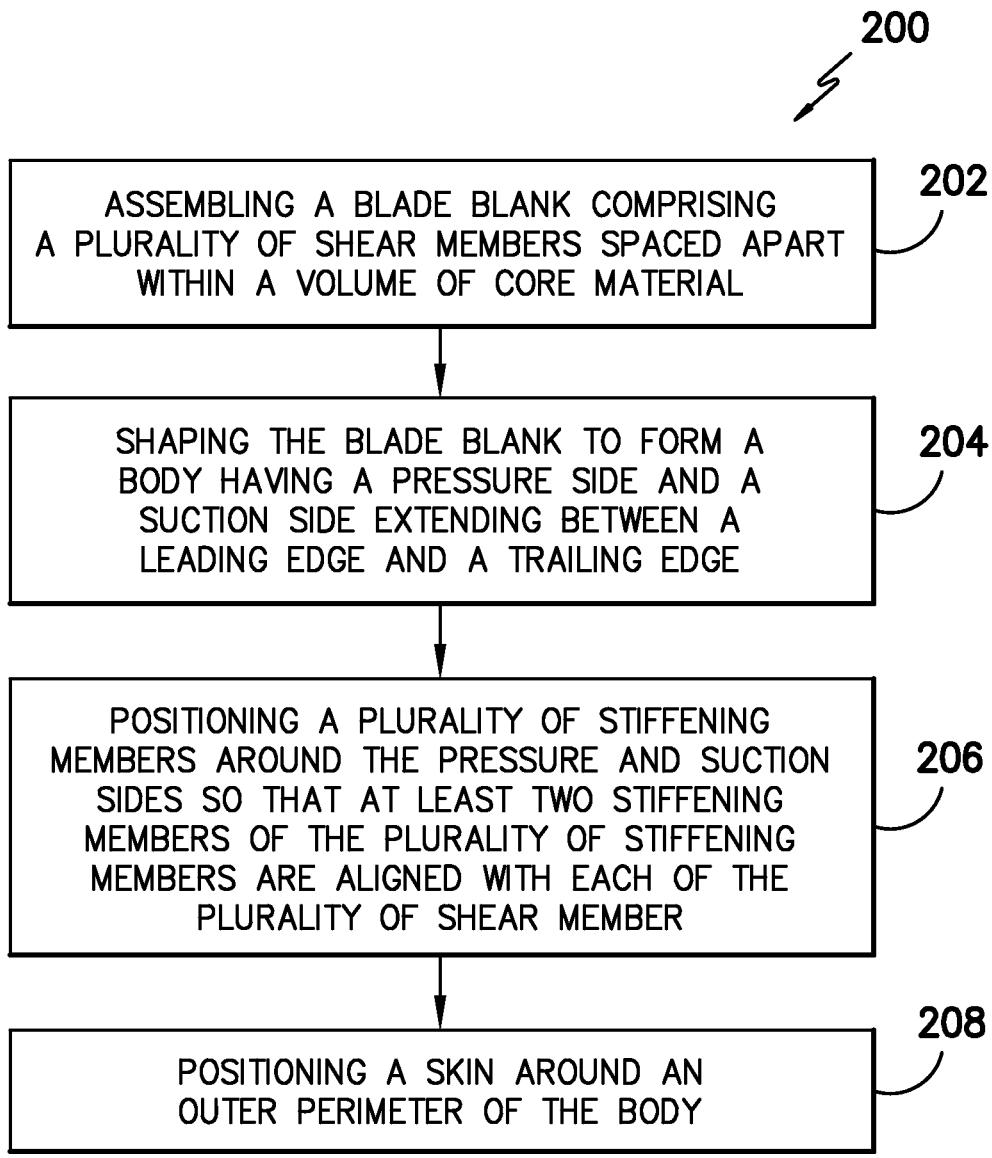
FIG. -4-

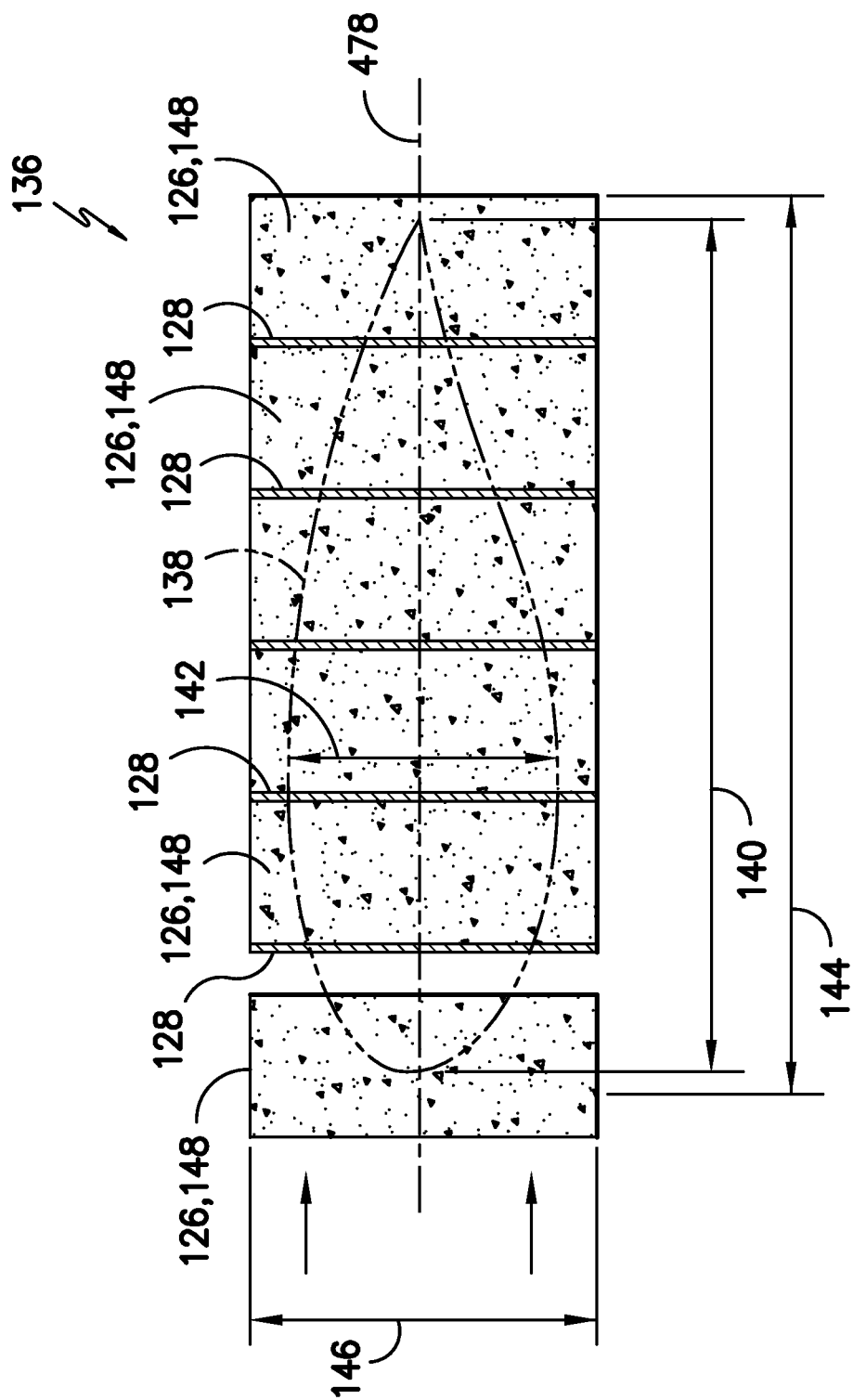
FIG. -5-

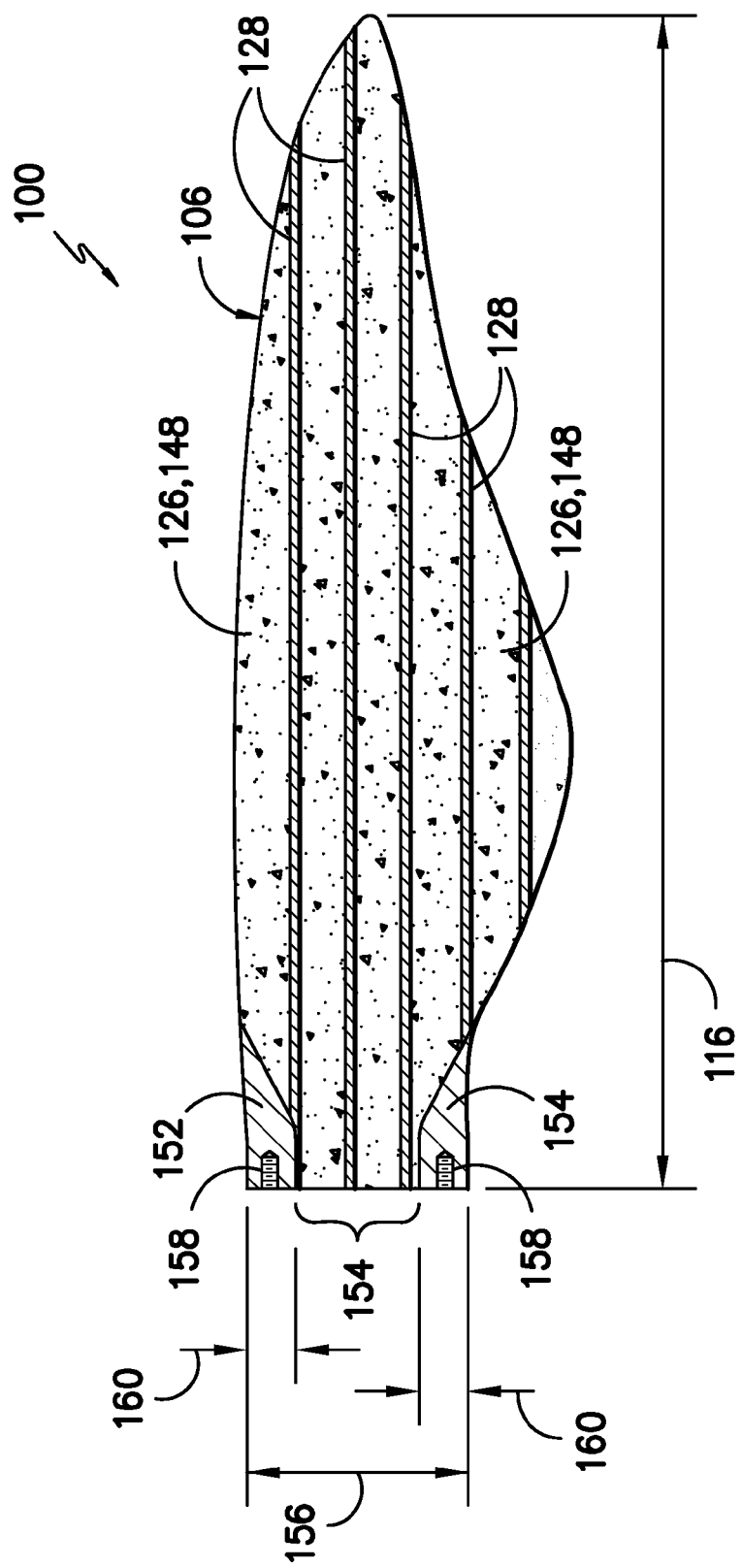
FIG. -6-

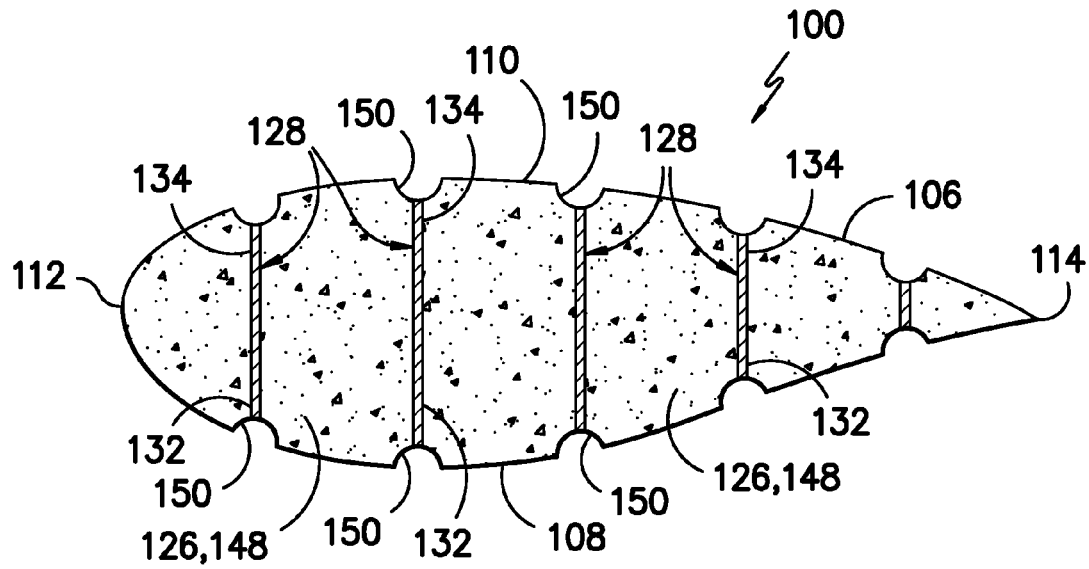
FIG. -7-
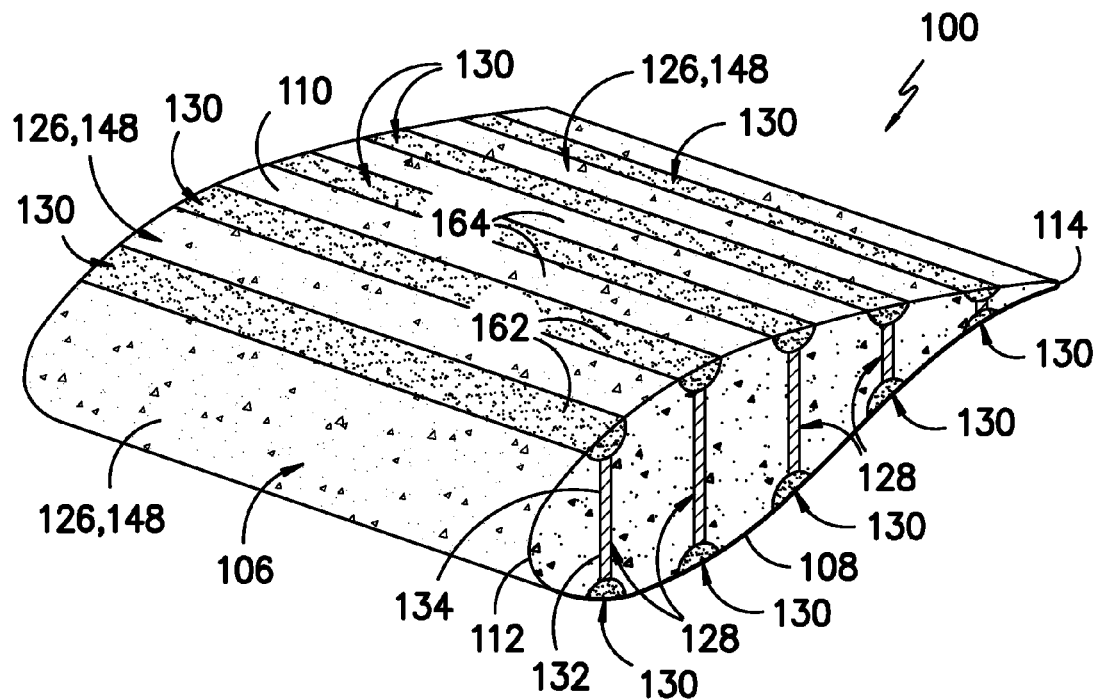
FIG. -8-

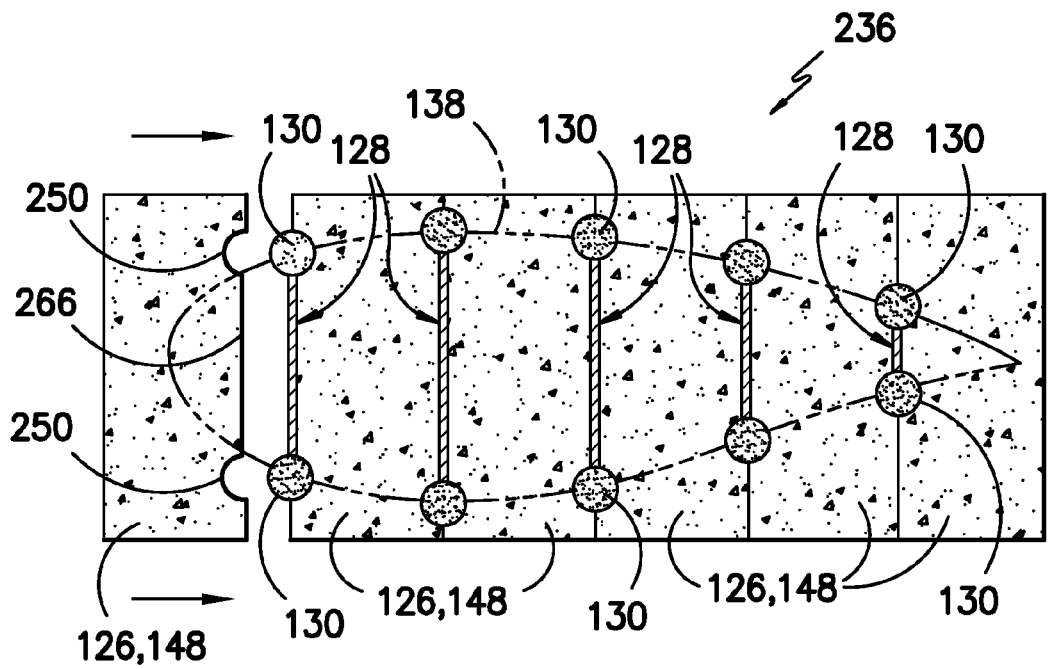
FIG. -9-
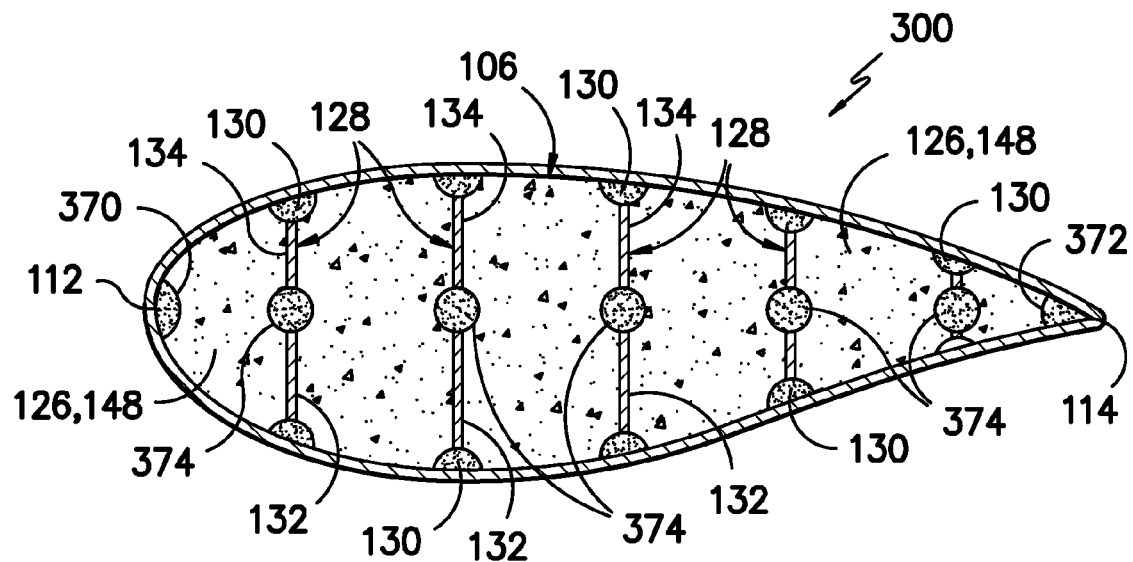
FIG. -10-

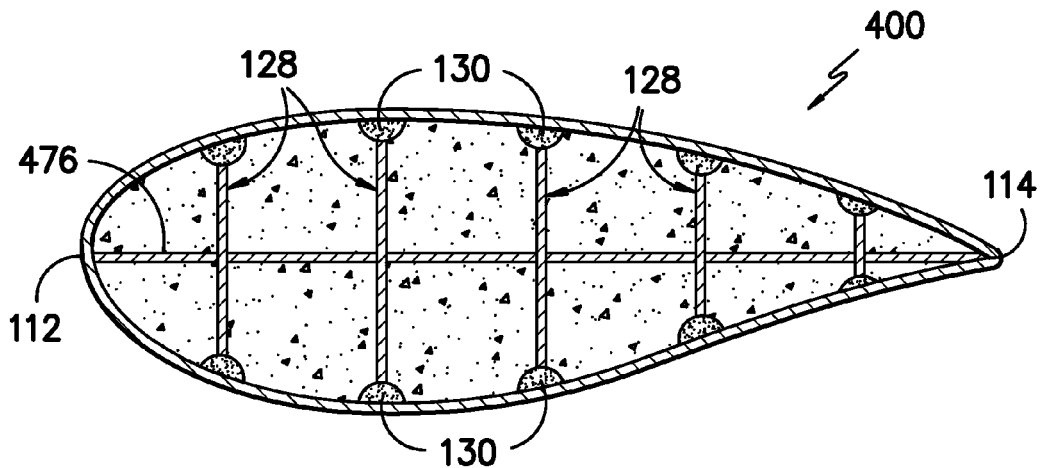
FIG. -11-
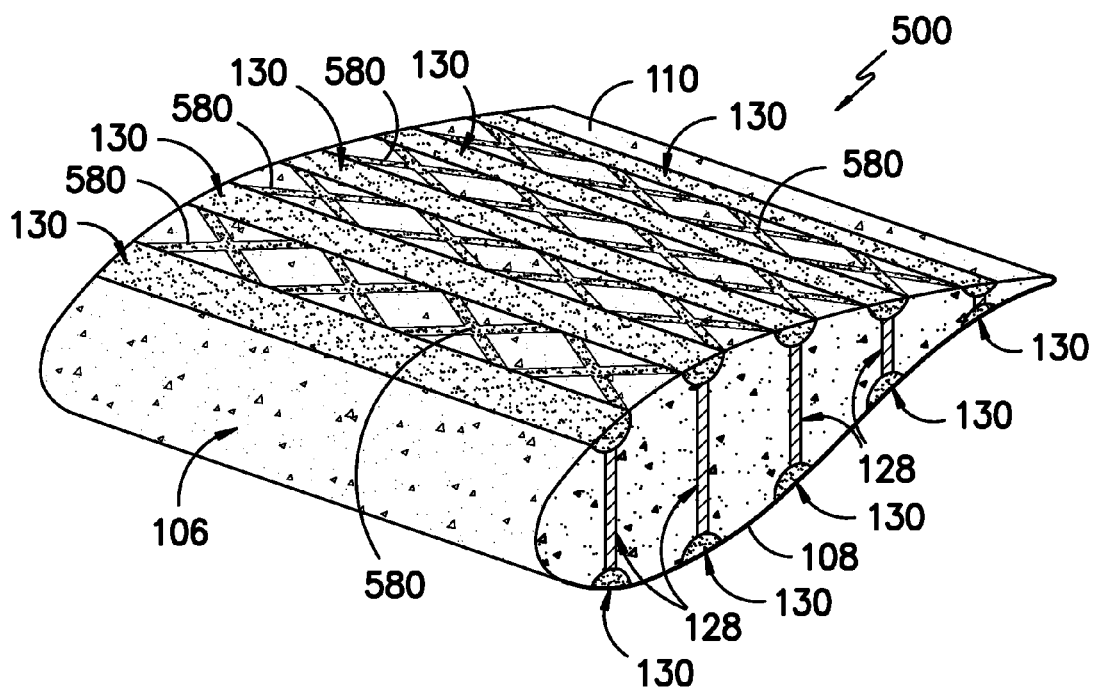
FIG. -12-

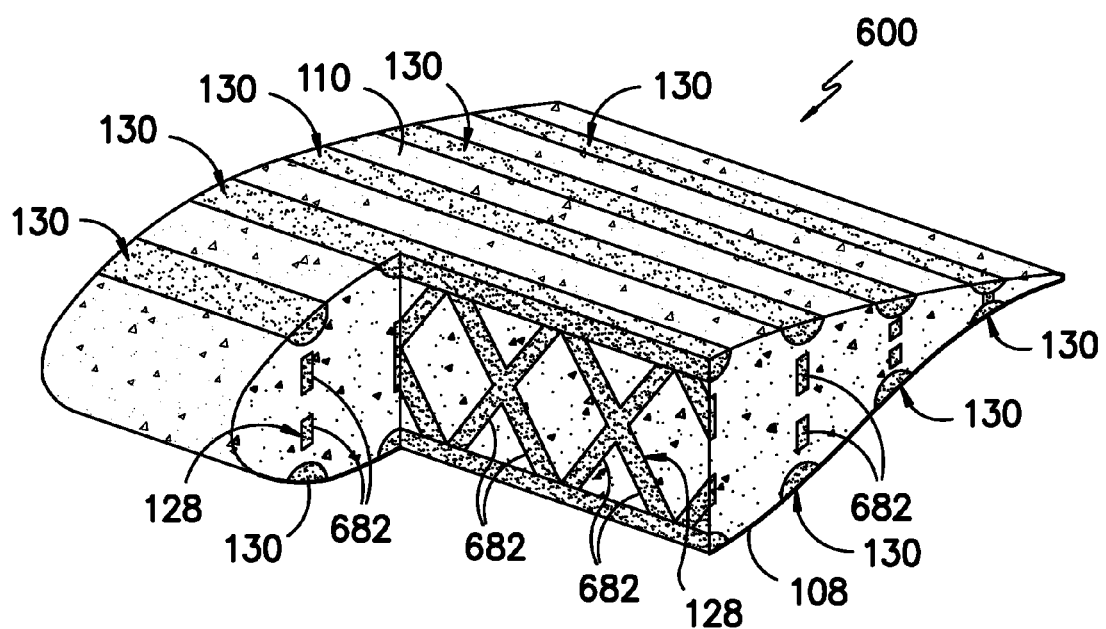
FIG. -13-

ROTOR BLADE FOR A WIND TURBINE AND METHODS OF MANUFACTURING THE SAME

RELATED APPLICATIONS

The present application is a continuation of U.S. patent application Ser. No. 13/228,708, filed on Sep. 9, 2011, the disclosure of which is hereby incorporated by reference herein in its entirety for all purposes.

FIELD OF THE INVENTION

The present subject matter relates generally to wind turbines and, more particularly, to wind turbine rotor blades and methods of manufacturing such rotor blades.

BACKGROUND OF THE INVENTION

Wind power is considered one of the cleanest, most environmentally friendly energy sources presently available, and wind turbines have gained increased attention in this regard. A modern wind turbine typically includes a tower, generator, gearbox, nacelle, and one or more rotor blades. The rotor blades capture kinetic energy from wind using known foil principles and transmit the kinetic energy through rotational energy to turn a shaft coupling the rotor blades to a gearbox, or if a gearbox is not used, directly to the generator. The generator then converts the mechanical energy to electrical energy that may be deployed to a utility grid.

In manufacturing rotor blades, it is generally necessary that specialized tooling and/or molds be used. For example, the blade halves of a conventional rotor blade are typically formed in large molds that are custom made for the particular size and shape of the rotor blade being produced. Accordingly, new molds must be purchased or otherwise made for each rotor blade size and shape being produced, which greatly increases the productions costs of rotor blades. In addition, conventional methods of forming the blade halves of a rotor blade typically include the use of a layup process wherein plies of reinforcing material are hand-placed into the custom made molds. This process is very laborious and greatly increases the time required to produce a rotor blade.

Application Ser. No. 12/966,219 entitled Methods of Manufacturing Rotor Blades for a Wind Turbine (filed Dec. 13, 2010 and assigned to the General Electric Company) generally discloses an improved method for manufacturing wind turbine rotor blades that reduces production costs and increases the speed at which the blades may be produced. Specifically, the application discloses that rotor blades may be manufactured by providing a blade blank composed of a filler material. The blade blank may be machined or otherwise shaped into the aerodynamic shape or profile of the rotor blade. An outer skin may then be applied to an outer perimeter of the shaped blade blank to form the exterior surface of the rotor blade and to provide a protective coating for the filler material. However, while the methods described in such application offer substantial advantages, the disclosure does not provide for significant structural components to be assembled within the rotor blade in order to provide stiffness and/or strength to the blade.

Accordingly, a method for manufacturing rotor blades that improves upon the method described above by providing a rotor blade with increased stiffness and/or strength would be welcomed in the technology.

BRIEF DESCRIPTION OF THE INVENTION

Aspects and advantages of the invention will be set forth in part in the following description, or may be obvious from the description, or may be learned through practice of the invention.

In one aspect, the present subject matter discloses a method for manufacturing a rotor blade for a wind turbine. The method may generally include assembling a blade blank comprising a shear member and a volume of core material and removing material from the blade blank to form a body having a pressure side and a suction side extending between a leading edge and a trailing edge. The shear member may have a first end disposed adjacent to the pressure side and a second end disposed adjacent to the suction side. In addition, the method may include positioning a skin around an outer perimeter of the body.

In another aspect, the present subject matter discloses a method of manufacturing a rotor blade for a wind turbine. The method may generally include assembling a blade blank comprising a shear member and a volume of core material and removing material from the blade blank to form a body having a pressure side and a suction side extending between a leading edge and a trailing edge. The shear member may have a first end disposed adjacent to the pressure side and a second end disposed adjacent to the suction side. In addition, the method may include forming a first channel at the first end of the shear member and a second channel at the second end of the shear member, positioning a first stiffening member within the first channel and a second stiffening member within the second channel and positioning a skin around an outer perimeter of the body.

In a further aspect, the present subject matter discloses a rotor blade for a wind turbine. The rotor blade may include a body having a shear member extending within a volume of core material. The body may be shaped so as to define a pressure side and a suction side extending between a leading edge and a trailing edge. The shear member may include a first end disposed adjacent to the pressure side and a second end disposed adjacent to the suction side. In addition, the body may further define a first channel at the first end of the shear member and a second channel at the second end of the shear member. The rotor blade may also include a first stiffening member positioned within the first channel, a second stiffening member positioned within the second channel and a skin extending around an outer perimeter of the body.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIG. 1 illustrates a perspective view of one embodiment of a wind turbine;

FIG. 2 illustrates a perspective view of one embodiment of a rotor blade in accordance with aspects of the present subject matter;

FIG. 3 illustrates a cross-sectional view of the rotor blade shown in FIG. 2 taken along line 3-3;

FIG. 4 illustrates a flow diagram of one embodiment of a method for manufacturing a rotor blade in accordance with aspects of the present subject matter;

FIG. 5 illustrates a cross-sectional view of one embodiment of a blade blank suitable for use in manufacturing the rotor blade shown in FIGS. 2 and 3;

FIG. 6 illustrates a cross-sectional, spanwise view of one embodiment of the blade blank shown in FIG. 5 after it has been shaped in accordance with aspects of the present subject matter;

FIG. 7 illustrates a cross-sectional view of the shaped blade blank shown in FIG. 6 taken along line 7-7, particularly illustrating one embodiment of channels formed around the pressure and suction sides of the rotor blade body;

FIG. 8 illustrates a partial, perspective view of the shaped blade blank shown in FIGS. 6 and 7 having stiffening members installed within the channels formed around the pressure and suction sides of the blade body;

FIG. 9 illustrates a cross-sectional view of another embodiment of a blade blank suitable for use in manufacturing the rotor blade shown in FIGS. 2 and 3;

FIG. 10 illustrates a cross-sectional view of another embodiment of a rotor blade in accordance with aspects of the present subject matter;

FIG. 11 illustrates a cross-sectional view of a further embodiment of a rotor blade in accordance with aspects of the present subject matter;

FIG. 12 illustrates a partial, perspective view of yet another embodiment of a rotor blade in accordance with aspects of the present subject matter; and, FIG. 13 illustrates a partial, perspective view of an even further embodiment of a rotor blade in accordance with aspects of the present subject matter.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In general, the present subject matter is directed to improved methods for manufacturing rotor blades for wind turbines and also rotor blades produced in accordance with such methods. In particular, the disclosed rotor blades may include a body formed from a core material (e.g., a foam material) that is configured to be machined or otherwise shaped into the aerodynamic shape or profile of the rotor blade. Additionally, a plurality of structural components (e.g., shear members, stiffening members and the like) may be disposed within and/or around the body to provide increased strength and/or stiffness to the rotor blade. The rotor blade may also include a cover skin extending around the outer perimeter of the body that forms the exterior surface of the rotor blade and provides a protective coating for the core material.

As will be apparent from the description provided herein, the disclosed methods generally provide for the manufacture of rotor blades without the use of specialized tooling and molds and without the laborious process of hand laying laminate plies within such molds. Specifically, the rotor blade may be manufactured from the inside-out by assembling a blade blank that can be machined or otherwise shaped into the aerodynamic shape or profile of the rotor blade. As such, the manufacturing costs and time required to produce the rotor blade may be reduced significantly, thereby improving the efficiency of the development of new rotor blade designs and increasing the speed at which rotor blades may be supplied to the marketplace. Moreover, due to the inclusion of various structural components, the manufactured rotor blade may have a structural configuration that enhances the strength and/or stiffness of the blade.

Additionally, it should be appreciated that, in several embodiments, the disclosed methods may be particularly advantageous for quickly and efficiently producing prototype rotor blades for testing new airfoil designs and the like. As such, new airfoil shapes and/or other blade configurations/features (e.g., aero-elastically tailored blades, winglets and the like) may be manufactured and tested immediately, without the additional time required for creating and/or obtaining specialized tooling and/or molds. However, the disclosed methods may also be utilized to produce rotor blades for use in the field. For example, rotor blades manufactured in accordance with the disclosed methods may be used as the primary and/or auxiliary rotor blades of a wind turbine.

Referring to the drawings, FIG. 1 illustrates perspective view of one embodiment of a wind turbine 10. The wind turbine 10 includes a tower 12 with a nacelle 14 mounted thereon. A plurality of rotor blades 16 are mounted to a rotor hub 18, which is, in turn, connected to a main flange that turns a main rotor shaft. The wind turbine power generation and control components are housed within the nacelle 14. It should be appreciated that the wind turbine 10 of FIG. 1 is provided for illustrative purposes only to place the present invention in an exemplary field of use. Thus, one of ordinary skill in the art should understand that the invention is not limited to any particular type of wind turbine configuration.

Referring now to FIGS. 2 and 3, one embodiment of a rotor blade 100 is illustrated in accordance with aspects of the present subject matter. In particular, FIG. 2 illustrates a perspective view of the rotor blade 100. Additionally, FIG. 3 illustrates a cross-sectional view of the rotor blade 100 shown in FIG. 2 taken about line 3-3.

As shown, the rotor blade 100 includes a blade root 102 configured for mounting the rotor blade 100 to the hub 18 of a wind turbine 10 (FIG. 1) and a blade tip 104 disposed opposite the blade root 102. A body 106 of the rotor blade 100 may extend between the blade root 102 and blade tip 104 and may generally define the aerodynamic shape of the rotor blade 100. For example, in several embodiments, the body 106 made define an airfoil-shaped cross-section, such as by being configured as a symmetrical or cambered airfoil. Thus, as shown in FIG. 3, the body 106 may include a pressure side 108 and a suction side 110 extending between a leading edge 112 and a trailing edge 114. In addition, the body 106 may generally include a span 116 defining the total length between the blade root 102 and the blade tip 104 and a chord 118 defining the total length between the leading edge 112 and the trailing edge 114. As is generally understood, the chord 118 may vary in length with respect to the span 116 as the body 106 extends from the blade root 102 to the blade tip 104.

It should be appreciated that the body 106 of the rotor blade 100 may also have additional aerodynamic features. For example, in one embodiment, the body 106 may be aeroelastically tailored, such as by being bent and/or twisted in a generally chordwise direction (i.e., a direction generally parallel to the chord 118) and/or in a generally spanwise direction (i.e., a direction generally parallel to the span 116).

Moreover, the rotor blade 100 may generally include a cover skin 120 surrounding the aerodynamically shaped body. Specifically, as shown in FIG. 3, the cover skin 120 may generally have an outer surface 122 defining the exterior surface of the rotor blade 100 and an inner surface 124 generally outlining the outer perimeter of the body 106. Thus, it should be appreciated that the cover skin 120 may generally be configured to conform to the profile or shape of the aerodynamic body 106 such that the outer surface 122 of the cover skin 120 generally defines the aerodynamic profile of the rotor blade 100.

As particularly shown in FIG. 3, the body 106 may be formed at least partially from a core material 126. In several embodiments, the body 106 may be formed substantially from the core material 126. By being formed "substantially from the core material 126", it is meant that greater than 50% of the volume of the body 106 (i.e., the volume of the rotor blade 100 defined within the inner surface 124 of the cover skin 120) is filled with or is otherwise occupied by the core material 126, such as greater than 60% of the volume of the body 106 or greater than 75% of the volume of the body 106 or greater than 85% of the volume of the body 106 and all other subranges therebetween. However, in alternative embodiments, less than 50% of the body 106 may be formed from the core material 126. For instance, significant portions and/or all of the core material 126 may be removed from within the rotor blade 100.

In general, the core material 126 may comprise any suitable material which is capable of being machined or otherwise shaped into the aerodynamic shape or profile of the body 106. For example, in several embodiments of the present subject matter, the core material 126 may comprise a relatively lightweight, low-density material. Thus, in a particular embodiment, the core material 126 may comprise a low-density foam material. Suitable low-density foam materials may include, but are not limited to, polystyrene foams (e.g., expanded polystyrene foams), polyurethane foams, other foam rubbers/resin-based foams and various other open cell and closed cell foams. Alternatively, the filer material 126 may comprise other suitable low-density materials, such as balsa wood, cork and the like.

Referring still to FIGS. 2 and 3, the rotor blade 100 may also include a plurality of structural components 128, 130 configured to carry the loads acting on the rotor blade 100 during operation of the wind turbine 10. For example, as shown in FIG. 3, the rotor blade 100 includes a plurality of shear members 128 spaced apart from one another in the chordwise direction. In general, each shear member 128 may be configured to extend lengthwise within the body 106 along at least a portion of the span 116. Additionally, as shown, each shear member 128 may be configured to extend generally perpendicular to the chordwise direction between the pressure and suction sides 108, 110 of the body 106, such as by extending between a first end 132 disposed generally adjacent to the pressure side 108 of the body 106 and a second end 134 disposed generally adjacent to the suction side 110 of the body 106. As such, the shear members 128 may define a shear path between the pressure and suction sides 108, 110 of the body 106, thereby allowing the shear members 128 to carry any shear loads acting on the rotor blade 100.

Moreover, as shown in FIG. 3, each shear member 128 may generally be configured as a solid, continuously extending structural component defining a rectangular cross-sectional shape. However, it should be appreciated that, in alternative embodiments, the shear members 128 may have any other suitable configuration and may define any other suitable cross-sectional shape that allows such members 128 to function as described herein. For instance, as will be described below with reference to FIG. 13, each shear member 128 may comprise a plurality of brace members 682 extending between the pressure and suction sides 108, 110 of the body 106.

In addition to the shear members 128, the rotor blade 100 may also include a plurality of stiffening members 130 extending lengthwise along at least a portion of the span 116 of the body 106. In general, the stiffening members 130 may be configured to be spaced apart around the pressure and suction sides 108, 110 of the body 106 in order to carry spanwise loads (e.g., bending loads) acting on the blade 100. Additionally, in several embodiments, the stiffening members 130 may be positioned within the rotor blade 100 so as to be aligned with the shear members 128, such as by being disposed between the cover skin 120 and each end 132, 134 of the shear members 128. Such placement of the stiffening members 130 may generally take advantage of the shear path created by the shear members 128, thereby increasing the load carrying capability of the stiffening members 130.

It should be appreciated that the shear members 128 and the stiffening members 130 may generally be formed from any suitable stiff and/or durable material that may provide stiffness and/or strength to the rotor blade 100. For example, such members 128, 130 may be formed from any suitable composite materials (e.g., fiber-reinforced composites), polymers (e.g., high strength plastics), metals (e.g., aluminum), wood or any other suitable materials or combinations of materials. Additionally, it should be appreciated that, although the disclosed rotor blade 100 is shown as including five shear members 128 and a corresponding number of stiffening members 130, the rotor blade 100 may generally include any suitable number of shear members 128 and/or stiffening members 130.

Referring now to FIG. 4, a flow diagram of one embodiment of a method 200 for manufacturing the rotor blade 100 shown in FIGS. 2 and 3 is illustrated in accordance with aspects of the present subject matter. As shown, the method 200 generally includes assembling a blade blank comprising a plurality of shear members spaced apart within a volume of core material 202, shaping the blade blank to form a body having a pressure side and a suction side extending between a leading edge and a trailing edge 204, positioning a plurality of stiffening members around the pressure and suction sides so that at least two stiffening members of the plurality of stiffening members are aligned with each of the plurality of shear members 206 and positioning a skin around an outer perimeter of the body 208. It should be appreciated that, although the various method elements 202, 204, 206, 208 illustrated in FIG. 4 are shown in a particular order, the elements may generally be performed in any sequence and/or order consistent with the disclosure provided herein. For example, as will be described below, the stiffening members 130 of the rotor blade 100 may be aligned with the shear members 128 before or after the blade blank 136 (FIG. 5) is shaped to form the body 106.

As indicated above, such a method 200 may generally provide for a reduction in both the production costs and the amount of time required to manufacture a rotor blade. Accordingly, new rotor blade designs may be produced with greater efficiency, thereby improving product development and increasing the speed at which rotor blades may be supplied to the marketplace. Moreover, by including structural components, such as the shear members 128 and the stiffening members 130, within the rotor blade 100, the manufactured blade may have improved strength and/or stiffness.

Referring now to FIG. 5, a cross-sectional view of one embodiment of a blade blank 136 that may be assembled in accordance with the disclosed method 200 is illustrated in accordance with aspects of the present subject matter. In general, the blade blank 136 may comprise a volume of core material 126 configured to be machined or otherwise shaped into the aerodynamic shape or profile (indicated by the dashed line 138) of the rotor blade body 106. Thus, it should be appreciated that, in several embodiments, the blade blank 136 may generally define any suitable shape having dimensions equal to or greater than the maximum chord 140, the maximum height 142 (i.e., the maximum height between the pressure and suction sides 108, 110 of the body 106) and the span 116 (FIG. 2) of the body 106 such that portions of the blade blank 136 may be removed in order to define the aerodynamic shape or profile of the body 106. For instance, in one embodiment, a width 144 of the blade blank 136 may generally be equal to or greater than the maximum chord 140 of the body 106 and a height 146 of the blank 136 may generally be equal to or greater than the maximum height 142 of the body 106. Similarly, a length (a dimension into the page) of the blank 136 may generally be equal to or greater than the span 116 of the body 106. However, in alternative embodiments, the blade blank 136 may be formed in segments, with each segment having a width 144, height 146 and/or length (not shown) corresponding to a fraction of the maximum chord 140, maximum height 142 and/or span 116 of the body 106.

In several embodiments, the shear members 128 of the rotor blade 100 may also be included within the blade blank 136. Specifically, as shown in FIG. 5, the blade blank 136 may have a layered construction, with the shear members 128 being spaced apart between a plurality of core material segments 148 comprising individual blocks or sections of the core material 126. In general, the layered construction of the blade blank 136 may be assembled or otherwise formed using any suitable means and/or method known in the art. In several embodiments, the core material segments 148 and the shear members 128 may comprise separate, pre-manufactured components which may be secured or otherwise assembled together to form the blade blank 136. For example, the core material segments 148 and the shear members 128 may be stacked together and then subsequently bonded, adhered, tied, fastened or otherwise attached to one another using any suitable means and/or method known in the art. Alternatively, the shear members 128 may be formed directly onto or within the core material segments 148. For instance, in one embodiment, each shear members 128 may be formed by laying up or otherwise assembling a plurality of layers of a composite material (e.g., a fiber reinforced composite material) directly onto a core material segment 148. Once the shear member 128 is formed onto the core material segment 148, another core material segment 148 may then be assembled on top of the shear member 128, with the process being repeated to form the entire blade blank 136.

It should be appreciated that the width of each core material segment 148 and the spacing between the shear members 128 may generally vary between different blade blanks 136 depending on numerous factors including, but not limited to, the size (e.g., the width of the maximum chord 140) and the amount of shear members 128 desired to be included within the rotor blade 100. Additionally, it should be appreciated that, in one embodiment, the shear members 128 may be equally spaced from one another within the blade blank 136. Alternatively, the spacing between each of the shear members 128 may be varied. For example, each of the core material segments 148 may define a differing width such that the spacing between the shear members 128 is varied within the blade blank 136 and, thus, within the rotor blade 100. Moreover, as shown in the illustrated embodiment, each of the core material segments 148 comprises a solid volume of core material 126. However, in alternative embodiments, some or all of the core material segments 148 may be non-solid and/or non-continuous. For example, air gaps and/or spaces may be defined in and/or between the core material segments 148 used to form the blade blank 136.

It should also be appreciated that, in several embodiments, various other structural components of the rotor blade 100 may be included within the blade blank 136. For example, as will be described below with reference to FIG. 9, the stiffening members 130 may be positioned between each core material segment 148 as the blade blank 236 is being assembled.

Referring now to FIGS. 6 and 7, there are illustrated cross-sectional views of one embodiment of the blade blank 136 shown in FIG. 5 after it has been shaped into the aerodynamic body 106 of the rotor blade 100. Specifically, FIG. 6 illustrates a cross-sectional, spanwise view of the shaped body 106. Additionally, FIG. 7 illustrates a cross-sectional, chordwise view of the shaped body 106.

In general, the blade blank 136 (FIG. 5) may be shaped into the desired shape or profile using any suitable shaping means/method known in the art that allows portions of the blade blank 136 to be removed in order to define the aerodynamic shape of the body 106, such as by removing portions of the core material segments 148 and shear members 128 to form the aerodynamic contours and profile of the pressure side 108, suction side 110, leading edge 112 and trailing edge 114 of the body 106. For instance, in one embodiment, the blade blank 136 may be machined using any suitable machining process and/or any suitable machining equipment, such as a computer numerical control (CNC) machine or any other precision machining equipment. Alternatively, the blade blank 136 may be shaped using other suitable tools and/or equipment, such as various different manual and powered hand tools. For example, the blade blank 136 may be shaped using cutting tools (e.g., knives, saws and the like), grinding/sanding equipment (e.g., electrical grinders, electrical sanders, sand paper and the like) and/or any other suitable tools/equipment known in the art.

In one embodiment, in addition to shaping the blade blank 136 to define the aerodynamic shape of the body 106, the blade blank 136 may also be shaped to accommodate the stiffening members 130 of the rotor blade 100. Specifically, a plurality of grooves or channels 150 may be formed in the blade blank 136 to allow the stiffening members 130 to be positioned around the pressure and suction sides 108, 110 of the body 106. For example, as shown in FIG. 7, the channels 150 may be formed around the pressure and suction sides 108, 110 so as to be aligned with the ends 132, 134 of each shear member 128. As such, when the stiffening members 130 are positioned within the channels 150, each pair of opposed stiffening members 130 may be disposed at and/or adjacent to the first and second ends 132, 134 of each shear member 128.

It should be appreciated that the channels 150 may be formed during the same manufacturing step performed to shape the blade blank 136 into the aerodynamic profile of the body 106 or in a separate manufacturing step. For instance, in one embodiment, the aerodynamic profile of the body 106 may be initially formed into the blade blank 136, with the channels 150 being subsequently formed in the blade blank 136 as a separate manufacturing step.

Moreover, in several embodiments of the present subject matter, a root sleeve 152 may be installed at the blade root 102

(FIG. 2) of the rotor blade 100 after the blade blank 136 has been shaped. Specifically, as shown in FIG. 6, the root sleeve 152 may be installed at a root end 154 of the shaped body 106. The root sleeve 152 may generally serve as an attachment mechanism for attaching the rotor blade 100 to the hub 18 of a wind turbine 10 (FIG. 1). Thus, it should be appreciated that the root sleeve 152 may generally be designed to have any suitable size, shape and/or configuration that permits the root sleeve 152 to be attached to a wind turbine hub 18. For example, in one embodiment, the root sleeve 152 may define a substantially cylindrical or circular shape having a diameter or height 156 generally corresponding to the diameter or height of the component of the hub 18 to which the rotor blade 100 is configured to be attached (e.g., a pitch bearing). Additionally, the root sleeve 152 may include a plurality of annularly spaced holes 158 defining a bolt hole pattern generally corresponding to the bolt hole pattern defined in the corresponding component of the hub 18 (e.g., the pitch bearing). As such, the root sleeve 152 may be attached to the hub 18 using suitable bolts, threaded rods and/or the like.

In general, the root sleeve 152 may generally be formed from any suitable material. However, in several embodiments, the root sleeve 152 may be formed from a relatively stiff and/or durable material. For example, the root sleeve 152 may be formed from any suitable composite materials (e.g., fiber-reinforced composites), polymers (e.g., high strength plastics), metals (e.g., aluminum), wood or any other suitable materials or combinations of materials which are capable of withstanding the loading that typically occurs along the attachment point of the hub 18 and the rotor blade 100 during operation of a wind turbine 10. Additionally, in one embodiment, the root sleeve 152 may comprise a pre-manufactured component which is configured to be assembled onto the root end 154 of the shaped body 106. Alternatively, the root sleeve 152 may be formed directly onto the root end 156 of the shaped body 106. For example, in a particular embodiment of the present subject matter, the root sleeve 152 may be formed by laying up or otherwise assembling a plurality of layers of a composite material (e.g., a fiber reinforced composite) directly onto the root end 154.

It should be appreciated that the root end 154 of the shaped body 106 may generally be machined or otherwise shaped so as to accommodate the root sleeve 152. For example, in one embodiment, an additional amount of the core material 126, corresponding to the width 160 of the root sleeve 152, may be removed from blade blank 136 at the root end 154 to permit the root sleeve 152 to be subsequently positioned, assembled or formed onto the root end 154. Additionally, in particular embodiment, the width 160 of the root sleeve 152 may generally taper as the root sleeve 152 extends away from the blade root 102. Thus, as shown in FIG. 6, the root end 154 of the shaped body 106 may generally be machined or otherwise shaped to include a corresponding tapered profile in order to accommodate the tapered width 160 of the root sleeve 152.

It should also be appreciated that, in several embodiments of the present subject matter, the entire aerodynamic profile of the body 106 need not be initially machined or otherwise formed into blade blank 136. For example, in one embodiment, only the root end 154 of the body 106 may be initially machined or otherwise formed. In such an embodiment, the root sleeve 152 may be positioned, assembled or formed onto the root end 154 prior to the remainder of the aerodynamic profile of the body 106 being formed in the blade blank 136.

Referring now to FIG. 8, there is illustrated a partial, perspective view of the shaped body 106 of the rotor blade 100 after the stiffening members 130 have been positioned within the channels 150 (FIG. 7) formed at each end 132, 134 of the shear members 128. As indicated above, the stiffening members 130 may generally be configured to provide strength and/or stiffness to the rotor blade 100 by carrying any spanwise loading (e.g., compressive and/or tensile bending loads) applied to the blade 100 during operation of a wind turbine 10. Thus, it should be appreciated that the stiffening members 130 may generally have any suitable shape, size and/or configuration that permits such members 130 to function as described herein. For example, as shown in the illustrated embodiment, the stiffening members 130 generally comprise spanwise extending rods having a semi-circular cross-sectional shape. However, in alternative embodiments, the stiffening members 130 may have a circular, rectangular, triangular and/or any other suitable cross-sectional shape and may be solid or hollow.

It should also be appreciated that, in several embodiments, the stiffening members 130 may comprise separate, pre-manufactured components that may be secured or otherwise assembled within the channels 150. For example, the stiffening members 130 may be initially formed and then subsequently bonded, adhered, tied, fastened or otherwise secured within the channels 150 using any suitable means and/or method known in the art. Specifically, in one embodiment, the stiffening members 130 may be pre-manufactured from a suitable composite material (e.g., a fiber-reinforced composite) using a pultrusion process and the subsequently installed within the channels 150. In another embodiment, the stiffening members 130 may be formed from a pre-preg composite material that may be cured after being installed within the channels 150. Alternatively, the stiffening members 130 may be formed directly onto and/or within the channels 150. For instance, in one embodiment, the stiffening members 130 may be formed by laying up or otherwise assembling a suitable reinforcing material (e.g., glass and/or carbon fibers) within the channels 150 and subsequently infusing a suitable matrix material (e.g., a suitable resin) around the reinforcing material.

Additionally, in several embodiments, the stiffening members 130 may be shaped or otherwise formed so that the pressure and suctions sides 108, 110 of the body 106 form a continuous, aerodynamic surface. For example, as shown in FIG. 8, an outer surface 162 of each stiffening member 130 may generally be shaped or otherwise formed so that the surface 166 forms a continuation of the aerodynamic profile of the body 106. As such, a smooth transition may be defined at the interface between the outer surface 162 of each stiffening member 130 and an outer surface 164 of each shaped core material segment 148.

Referring back to FIG. 3, as indicated above, the rotor blade 100 may also include a cover skin 120 defining the exterior surface of the rotor blade 100. In general, the cover skin 120 may be configured to conform to and be disposed around the outer perimeter of the body 106 and, in some embodiments, the root sleeve 152 such that a smooth, aerodynamic profile is defined by the rotor blade 100. Additionally, as an outer coating, the cover skin 120 may provide support as well as protection to the core material 126 (e.g., impact protection).

It should be appreciated that the cover skin 120 may generally comprise any suitable material and may be formed using any suitable method and/or process. For example, in one embodiment, the cover skin 120 may comprise a composite material (e.g., a fiber-reinforced composite) formed around the outer perimeter of the body 106 using a hand layup process or any other suitable laminate forming method. In another embodiment, the cover skin 120 may comprise a spray-on surface coating, such as a polyurethane elastomeric spray-on compound. In a further embodiment, the cover skin 120 may comprise a thermoplastic-based coating formed using a heat-shrink wrapping process and/or a heat-shrink tubing process.

Referring now to FIG. 9, a cross-sectional view of another embodiment of a blade blank 236 that may be assembled in accordance with the disclosed method 200 is illustrated in accordance with aspects of the present subject matter. Specifically, unlike the embodiment described above with reference to FIGS. 5-7, the stiffening members 130 of the rotor blade 100 may be installed within the blade blank 236 prior to shaping the blank 236. Thus, as shown, the blade blank 236 may have a layered construction, with the shear members 128 and stiffening members 130 being disposed between the core material segments 148.

It should be appreciated that the layered construction of the blade blank 236 may be assembled or otherwise formed using any suitable means and/or method known in the art. For example, in several embodiments, the core material segments 148 may be shaped to accommodate the shear members 128 and/or the stiffening members 130. Specifically, as shown in FIG. 9, each core material segment 148 may include a recessed surface 266 to accommodate each shear member 128 and a groove or channel 250 to accommodate each stiffening member 130. As such, the shear members 128 and the stiffening members 130 may be positioned between the core material segments 148 as the blade blank 236 is being assembled.

Similar to the embodiment described above, in one embodiment, the core material segments 148, the shear members 138 and/or the stiffening members 130 may comprise separate, pre-manufactured components that may be secured or otherwise assembled together to form the blade blank 236. Alternatively, the shear members 128 and/or stiffening members 130 may be formed directly onto or within the core material segments 148 to form the blade blank 236. For instance, in one embodiment, the shear members 128 and/or stiffening members 130 may be formed by laying up or otherwise assembling a plurality of layers of a composite material (e.g., a fiber reinforced composite material) directly onto a core material segment 148. Once the shear member 128 and/or stiffening member 130 has been formed onto the core material segment 148, another core material segment 148 may then be assembled on top of the shear member 128 and/or stiffening member 130, with the process being repeated to form the entire blade blank 236.

Once the blade blank 236 is assembled, the blank 236 may then be shaped to form the aerodynamic profile (indicated by the dashed line 138 in FIG. 9) of the rotor blade body 106. For instance, as described above, the blade blank 236 may be machined or otherwise processed to remove portions of the core material segments 148, the shear members 128 and/or the stiffening members 130 in order to form the aerodynamic contours and profile of the pressure side 108, suction side 110, leading edge 112 and trailing edge 114 (FIG. 3) of the body 106. Upon shaping the blade blank 236, the cover skin 120 (FIG. 3) may then be positioned around the outer perimeter of the body 106 to form the exterior surface of the rotor blade 100.

Referring now to FIG. 10, a cross-sectional view of another embodiment of a rotor blade 300 is illustrated in accordance with aspects of the present matter. In particular, FIG. 10 illustrates examples of several different structural components 370, 372, 374 that may optionally be included within the rotor blade 300.

As shown in the illustrated embodiment, in addition to the shear members 128 and stiffening members 130 described above, the rotor blade 300 also includes a pair of edge stiffening members 370, 372 designed to carry edge loads acting on the rotor blade 300 and also improve the buckling resistance of the rotor blade 300 (especially at the trailing edge 114). Specifically, the rotor blade 300 includes a first edge stiffening member 370 disposed at or adjacent to the leading edge 112 and a second edge stiffening member 372 disposed at or adjacent to the trailing edge 114, with each edge stiffening member 370, 372 extending lengthwise along at least a portion of the span 116 (FIG. 2) of the rotor blade 300.

It should be appreciated that the edge stiffening members 370, 372 may generally be configured the same as or similar to the stiffening members 130 described above. Thus, the edge stiffening members 370, 372 may generally have any suitable shape, size and/or configuration that permits such members 370, 372 to function as described herein. For example, as shown in the illustrated embodiment, the first edge stiffening member 370 generally defines a semi-circular cross-sectional shape while the second edge stiffening member 372 has a cross-sectional shape generally corresponding to the aerodynamic profile of the rotor blade 300 at the trailing edge 114. However, in alternative embodiments, the edge stiffening members 370, 372 may have any other suitable cross-sectional shape and may be solid or hollow.

Additionally, the edge stiffening members 370, 372 may generally be formed from any suitable stiff and/or durable material that may permit such members to provide stiffness and/or strength to the rotor blade 300. For example, in one embodiment the edge stiffening members 370, 372 may be formed from any suitable composite materials (e.g., fiber-reinforced composite), polymers (e.g., high strength plastics), metals (e.g., aluminum), wood or any other suitable materials or combinations of materials. Moreover, the edge stiffening members 370, 372 may be installed within the rotor blade 300 using any suitable means and/or method. For example, similar to the embodiment described above with reference to FIGS. 5-7, the edge stiffening members 370, 372 may be installed after the blade blank 136 (FIG. 5) is shaped, such as by forming grooves or channels (not shown) at the leading and trailing edges 112, 114 during shaping of the blade blank 136 and subsequently installing the edge stiffening members 370, 372 within such channels (e.g., by installing pre-manufactured edge stiffening members within the channels or by assembling the edge stiffening members within the channels). Alternatively, similar to the embodiment described above with reference to FIG. 9, the edge stiffening members 370, 372 may be installed before the blade blank 236 is shaped, such as by installing the edge stiffening members 370, 372 within the core material segments 148 during assembly of the blade blank 236.

Referring still to FIG. 10, the rotor blade 300 may also include at least one auxiliary stiffening member 374 disposed at one or more locations along the height of each shear member 128. Specifically, as shown in the illustrated embodiment, a single auxiliary stiffening member 374 is disposed between the first and second ends 132, 134 of each shear member 128. However, in alternative embodiments, the rotor blade 300 may include two or more auxiliary stiffening members 374 spaced apart between the first and second ends 132, 134 of each shear member 128. By positioning such auxiliary stiffening member(s) 374 along the height of each shear member 128, the auxiliary stiffening member(s) 374 may generally increase the capability of the rotor blade 300 to carry shear loads by reducing the unsupported distance along the shear member 128. Moreover, each auxiliary stiffening member 374 may also provide buckling resistance to the rotor blade 300.

Similar to the edge stiffening members 370, 372, the auxiliary stiffening members 374 may generally be configured the same as or similar to the stiffening members 130 described above. Thus, the auxiliary stiffening members 374 may generally have any suitable shape, size and/or configuration that permits such members 374 to function as described herein. For example, as shown in the illustrated embodiment, the auxiliary stiffening members 374 generally define a circular cross-sectional shape. However, in alternative embodiments, the auxiliary stiffening members 374 may have a semi-circular, rectangular, triangular and/or any other suitable cross-sectional shape and may be solid or hollow. Additionally, auxiliary stiffening members 374 may be formed from any suitable stiff and/or durable material (e.g., any suitable composite materials, polymers, metals, wood and the like) and may be installed within the rotor blade 300 using any suitable means and/or method known in the art. For example, in one embodiment, the auxiliary stiffening members 374 may be installed after the blade blank 136, 236 is assembled, such as by pre-forming grooves or channels within the core material segments 148 to enable the auxiliary stiffening members 374 to be installed along the shear members 128 after the blade blank 136, 236 is assembled and/or shaped. Alternatively, similar to the embodiment described above with reference to FIG. 9, the auxiliary stiffening members 374 may be installed during assembly of the blade blank 236, such as by assembling or forming the shear members 128, stiffening members 130 and/or auxiliary stiffening members 374 between each core material segment 148. Specifically, in one embodiment, the shear members 128, stiffening members 130 and/or auxiliary stiffening members 374 may be formed together by laying up or otherwise assembling a plurality of layers of a composite material (e.g., a fiber reinforced composite material) directly between each core material segment 148.

It should be appreciated that the rotor blade 300 may generally include any combination of the structural components 128, 130, 370, 372, 374 described above and, thus, need not be configured exactly as shown in FIG. 10. For example, the auxiliary stiffening members 374 may be included within the rotor blade 300 in addition, or as an alternative, to the edge stiffening members 370, 372.

Referring now to FIG. 11, a cross-sectional view of a further embodiment of a rotor blade 400 is illustrated in accordance with aspects of the present matter. In particular, FIG. 11 illustrates an example of another structural component 476 that may optionally be included within the rotor blade 400.

As shown, in addition to the shear members 128 and stiffening members 130 described above, the rotor blade 400 also includes one or more transverse stiffening members 476 oriented generally perpendicular to the shear members 128. For example, in the illustrated embodiment, the rotor blade 400 includes a single transverse stiffening member 476 extending in the chordwise direction from generally adjacent the leading edge 112 to generally adjacent the trailing edge 114. However, in alternative embodiments, the rotor blade 400 may include any suitable number of transverse stiffening members 476 spaced apart within the rotor blade 400. The transverse stiffening member(s) 476 may provide edge stiffness and/or buckling resistance to the rotor blade 400 and/or may generally improve the structural integrity of the rotor blade 400.

It should be appreciated that, similar to the other structural components 128, 130, 370, 372, 374 described herein, the transverse stiffening member(s) 476 may generally be formed from any suitable stiff and/or durable material that may permit such members 476 to provide stiffness and/or strength to the rotor blade 400. For example, the transverse stiffening member(s) 476 may be formed from any suitable composite materials (e.g., fiber-reinforced composites), polymers (e.g., high strength plastics), metals (e.g., aluminum), wood or any other suitable materials or combinations of materials. Moreover, the transverse stiffening member(s) 476 may be installed within the rotor blade 400 using any suitable means and/or method known in the art. Thus, in several embodiments, the transverse stiffening member(s) 476 may be installed during assembly of the blade blank 136, 236. For instance, each core material segment 148 described above with reference to FIG. 5 may be split horizontally (e.g., along the dashed line 478 shown in FIG. 5) so that the illustrated transverse stiffening member 476 may be assembled into the blade blank 136, such as by laying-up the transverse stiffening member(s) 476 between the split core material segments 148.

It should also be appreciated that the transverse stiffening member(s) 476 may be included within the rotor blade 400 in addition, or as an alternative, to the edge stiffening members 370, 372 and/or the auxiliary stiffening members 374. For instance, in one embodiment, the transverse stiffening member(s) 476 may be configured to extend generally chordwise between the edge stiffening members 370, 372 and/or between each auxiliary stiffening member 374.

Referring now to FIG. 12, a partial, perspective view of another embodiment of a rotor blade 500 is illustrated in accordance with aspects of the present matter. In particular, FIG. 12 illustrates the rotor blade 500 with the cover skin 120 removed in order to show another example of structural components 580 that may optionally be included within the rotor blade 500.

As shown, in addition to the shear members 128 and stiffening members 130 described above, the rotor blade 500 also includes a plurality of cross members 580 extending between adjacent stiffening members 130 on the pressure and suction sides 108, 110 of the body 106. The cross members 580 may generally be configured to provide torsional stiffness to the rotor blade 500. Moreover, by positioning the cross members 500 around the outer circumference of the body 106 (i.e., adjacent to and/or in-plane with the cover skin 120 (not shown)), the cross members 580 may reduce the shear and torsional loads that must be carried by the skin 120.

As shown in FIG. 12, the cross members 580 generally extend diagonally between each pair of adjacent stiffening members 130, with pairs of cross members 580 intersecting one another to form a cross or "X" pattern. However, in another embodiment, the cross members 580 may be configured to extend diagonally between adjacent stiffening members 130 without intersecting, such as by forming a zigzag pattern between the stiffening members 130. Alternatively, the cross members 580 may have any other orientation between each pair of adjacent stiffening members 130. For instance, in one embodiment, the cross members 580 may extend perpendicularly between adjacent stiffening members 130 (e.g., in the chordwise direction) and may be spaced apart from one another in the spanwise direction along the length of the stiffening members 130. In another embodiment, the cross members 580 may be oriented both perpendicularly and diagonally, such as by forming a "Z" pattern between each pair of adjacent stiffening members 130.

It should be appreciated that the cross members 580 may generally be configured the same as or similar to the stiffening members 130 described above. Thus, the cross members 580 may generally have any suitable shape, size and/or configuration that permits such members 580 to function as described herein. Additionally, the cross members 580 may be formed from any suitable stiff and/or durable material that permits such members 580 to provide stiffness and/or strength to the rotor blade 200. For example, the cross member(s) 580 may be formed from any suitable composite materials (e.g., fiber-reinforced composites), polymers (e.g., high strength plastics), metals (e.g., aluminum), wood or any other suitable materials or combinations of materials.

It should also be appreciated that the cross members 580 may be installed within the rotor blade 500 using any suitable means and/or method known in the art. For example, with reference to the embodiment described above with reference to FIGS. 5-7, in addition to the channels 150 formed in the body 106 to accommodate the stiffening members 130, suitable grooves or channels may also be formed in the pressure and suction sides 108, 110 of the body 106 to accommodate the cross members 580. As such, the cross members 580 may be installed before, after or simultaneously with installation of the stiffening members 130.

Additionally, it should be appreciated that the cross members 580 may be installed within the rotor blade 500 in combination with any of the other structural components 128, 130, 370, 372, 374, 476 described herein. For example, in one embodiment, the cross members 580 may be installed within the rotor blade 500 together with the edge stiffening members 370, 372 described above. In such an embodiment, additional cross members 580 may also be installed within the rotor blade to link each edge stiffening member 370, 372 to the adjacent stiffening members 130 disposed on the pressure and suction sides 108, 110 of the body 106.

Referring now to FIG. 13, a partial, perspective view of a further embodiment of a rotor blade 600 is illustrated in accordance with aspects of the present matter. In particular, FIG. 13 illustrates the rotor blade 600 with the cover skin 120 (FIG. 3) removed and a portion of the body 106 cut-away to show a variation in the structural components 682 that may be utilized to form each shear member 128 described above.

As shown, each shear member 128 is configured as a plurality of brace members 682 extending between each pair of opposed stiffening members 130 disposed along the pressure and suction sides 108, 110 of the body 106. In the illustrated embodiment, the brace members 682 extend diagonally between each pair of opposed stiffening members 130, with pairs of brace members 682 intersecting one another to form a cross or "X" pattern. However, in another embodiment, the brace members 682 may be configured to extend diagonally between opposed stiffening members 130 without intersecting, such as by forming a zigzag pattern between the stiffening members 130. Alternatively, the brace members 682 may have any other orientation between each pair of opposed stiffening members 130. For instance, in one embodiment, the brace members 682 may extend perpendicularly between the opposed stiffening members 130 and may be spaced apart from one another in the spanwise direction along the length of the stiffening members 130. In another embodiment, the brace members 682 may be oriented both perpendicularly and diagonally, such as by forming a "Z" pattern between each pair of opposed stiffening members 130.

It should be appreciated that the brace members 682 may generally be configured the same as or similar to the stiffening members 130 described above. Thus, the brace members 682 may generally have any suitable shape, size and/or configuration that permits such members 682 to provide stiffness and/or strength to the rotor blade 600. Additionally, the brace members 682 may be formed from any suitable stiff and/or durable material. For example, the brace member(s) 682 may be formed from any suitable composite materials (e.g., fiber-reinforced composites), polymers (e.g., high strength plastics), metals (e.g., aluminum), wood or any other suitable materials or combinations of materials.

It should also be appreciated that the brace members 682 may be installed within the rotor blade 600 using any suitable means and/or method known in the art. For example, similar to the embodiment described above with reference to FIG. 9, the brace members 682 may be installed during assembly of the blade blank 236, such as by assembling or forming the brace members 682 and stiffening members 130 between each core material segment 148. Specifically, in one embodiment, the brace members 682 and stiffening members 130 may be formed together by laying up or otherwise assembling a plurality of layers of a composite material (e.g., a fiber reinforced composite material) directly between each core material segment 148.

Additionally, it should be appreciated that the brace members 682 may be installed within the rotor blade 600 in combination with any of the other structural components 128, 130, 370, 372, 374, 476, 580 described herein.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method for manufacturing a rotor blade for a wind turbine, the method comprising:
   assembling a blade blank comprising a shear member and a volume of core material;
   removing material from the blade blank to form a body having a pressure side and a suction side extending between a leading edge and a trailing edge, the shear member having a first end disposed adjacent to the pressure side and a second end disposed adjacent to the suction side;
   positioning a stiffening member adjacent to at least one of the first end or the second end of the shear member; and
   positioning a skin around an outer perimeter of the body.

2. The method of claim 1, wherein removing material from the blade blank to form a body comprises removing material from at least one of the shear member or the core material to form the body.

3. The method of claim 1, wherein positioning a stiffening member adjacent to at least one of the first end or the second end of the shear member comprises positioning a first stiffening member at the first end of the shear member and a second stiffening member at the second end of the shear member.

4. The method of claim 3, further comprising forming a first channel at the first end of the shear member and a second channel at the second end of the shear member.

5. The method of claim 4, wherein positioning a first stiffening member at the first end of the shear member and a second stiffening member at the second end of the shear member positioning the first stiffening member within the first channel and the second stiffening member within the second channel.

6. The method of claim 5, wherein positioning the first stiffening member within the first channel and the second stiffening member within the second channel comprises forming the first stiffening member within the first channel and the second stiffening member within the second channel.

7. The method of claim 6, wherein the first and second stiffening members are formed within the first and second channels by curing a composite material installed within the first and second channels.

8. The method of claim 6, wherein the first and second stiffening members are formed within the first and second channels by using a wet lay-up process.

9. The method of claim 4, wherein forming a first channel at the first end of the shear member and a second channel at the second end of the shear member comprises forming the first and second channels while the material is being removed from the blade blank to form the body.

10. The method of claim 4, wherein forming a first channel at the first end of the shear member and a second channel at the second end of the shear member comprises removing additional material from the blade blank after the body has been formed in order to form the first and second channels.

11. The method of claim 1, further comprising positioning an edge stiffening member at or adjacent to the trailing edge.

12. The method of claim 1, wherein assembling a blade blank comprising a shear member and a volume of core material comprises assembling the shear member between two core material segments to form the blade blank.

13. A method for manufacturing a rotor blade for a wind turbine, the method comprising:
assembling a blade blank comprising a shear member and a volume of core material;
removing material from the blade blank to form a body having a pressure side and a suction side extending between a leading edge and a trailing edge, the shear member having a first end disposed adjacent to the pressure side and a second end disposed adjacent to the suction side;
forming a first channel at the first end of the shear member and a second channel at the second end of the shear member;
positioning a first stiffening member within the first channel and a second stiffening member within the second channel; and,
positioning a skin around an outer perimeter of the body.

14. The method of claim 13, wherein positioning the first stiffening member within the first channel and the second stiffening member within the second channel comprises forming the first stiffening member within the first channel and forming the second stiffening member within the second channel.

15. The method of claim 14, wherein the first and second stiffening members are formed within the first and second channels by curing a composite material installed within the first and second channels.

16. The method of claim 14, wherein the first and second stiffening members are formed within the first and second channels by using a wet lay-up process.

17. The method of claim 13, wherein forming a first channel at the first end of the shear member and a second channel at the second end of the shear member comprises forming the first and second channels while the material is being removed from the blade blank to form the body.

18. The method of claim 13, wherein forming a first channel at the first end of the shear member and a second channel at the second end of the shear member comprises removing additional material from the blade blank after the body has been formed to form the first and second channels.

* * * * *